(12) United States Patent
Kuk

(10) Patent No.: US 11,325,704 B2
(45) Date of Patent: May 10, 2022

(54) UNMANNED AUTOMATED HOOK COUPLING DEVICE

(71) Applicant: VESSEL AEROSPACE CO., LTD., Gyeonggi-do (KR)

(72) Inventor: Tae Seung Kuk, Seoul (KR)

(73) Assignee: VESSEL AEROSPACE CO., LTD., Gyeonggi-Do (KR)

( * ) Notice: Subject to any disclaimer, the term of this patent is extended or adjusted under 35 U.S.C. 154(b) by 471 days.

(21) Appl. No.: 16/320,091

(22) PCT Filed: Aug. 11, 2017

(86) PCT No.: PCT/KR2017/008730
§ 371 (c)(1),
(2) Date: Jan. 23, 2019

(87) PCT Pub. No.: WO2018/038438
PCT Pub. Date: Mar. 1, 2018

(65) Prior Publication Data
US 2019/0152600 A1    May 23, 2019

(30) Foreign Application Priority Data
Aug. 25, 2016  (KR) .................... 10-2016-0108337

(51) Int. Cl.
*B66C 1/34*  (2006.01)
*B64C 39/02*  (2006.01)
(Continued)

(52) U.S. Cl.
CPC .............. *B64C 39/024* (2013.01); *B64D 1/02* (2013.01); *B64D 1/22* (2013.01); *B66C 1/34* (2013.01);
(Continued)

(58) Field of Classification Search
CPC .......... B64C 39/024; B64D 1/02; B64D 1/22; B66C 1/34; B66C 13/08; B66C 13/40; B66C 13/46; B66C 13/48; G01S 19/42
(Continued)

(56) References Cited

U.S. PATENT DOCUMENTS 8,590,841 B1 * 11/2013 Hall ...................... B66C 23/18
                                                    244/137.1
2014/0032034 A1 * 1/2014 Raptopoulos ........ G05D 1/0088
                                                         701/25
(Continued)

FOREIGN PATENT DOCUMENTS

JP          7-291195       11/1995
JP         11-011859        1/1999
(Continued)

OTHER PUBLICATIONS

International Search Report for PCT/KR2017/008730 dated Nov. 23, 2017 and its English translation from WIPO (now published as WO 2018/021783 A1).
(Continued)

*Primary Examiner* — Peter D Nolan
*Assistant Examiner* — Luke Huynh
(74) *Attorney, Agent, or Firm* — Ladas & Parry, LLP

(57) ABSTRACT

Disclosed is an unmanned automated hook-fastening device including a device coupler, a propulsion unit, a transmitter, a receiver, hook pliers, and an unloading transmitter. The propulsion unit adjusts the position of the hoisting unit with respect to the object, on the basis of the position signal transmitted by the transmitter and received by the receiver, and adjusts the position of the hoisting unit coupled to the object, on the basis of the position signal transmitted by the unloading transmitter and received by the receiver. It is possible to easily track the position of a hook of the object
(Continued)

to be hoisted, automatically fasten the hook pliers to the hook, and automatically fasten the hook to a crane without a monitoring system.

5 Claims, 13 Drawing Sheets

(51) Int. Cl.
| | | |
|---|---|---|
| *B64D 1/02* | (2006.01) | |
| *B66C 13/48* | (2006.01) | |
| *B66C 13/40* | (2006.01) | |
| *B66C 13/46* | (2006.01) | |
| *B66C 13/08* | (2006.01) | |
| *B64D 1/22* | (2006.01) | |
| *G01S 19/42* | (2010.01) | |

(52) U.S. Cl.
CPC .............. *B66C 13/08* (2013.01); *B66C 13/40* (2013.01); *B66C 13/46* (2013.01); *B66C 13/48* (2013.01); *G01S 19/42* (2013.01); *B64C 2201/128* (2013.01)

(58) Field of Classification Search
USPC .............................................................. 701/3
See application file for complete search history.

(56) References Cited

U.S. PATENT DOCUMENTS

| | | | |
|---|---|---|---|
| 2016/0023761 A1* | 1/2016 | McNally | H02G 1/02 29/407.01 |
| 2018/0044020 A1* | 2/2018 | Severy | B64D 45/02 |

FOREIGN PATENT DOCUMENTS

| | | | |
|---|---|---|---|
| JP | 2014-97875 | | 5/2014 |
| KR | 10-0855859 | | 8/2008 |
| KR | 10-2010-0022835 | | 3/2010 |
| KR | 20100022835 A | * | 3/2010 |
| KR | 10-1093343 | | 12/2011 |
| KR | 10-1311873 | | 9/2013 |
| WO | 2016/037219 | | 3/2016 |

OTHER PUBLICATIONS

Written Opinion of the International Searching Authority for PCT/KR2017/008730 dated Nov. 23, 2017 and its English translation by Google Translate.

* cited by examiner

UNMANNED AUTOMATED HOOK COUPLING DEVICE

CROSS-REFERENCE TO RELATED APPLICATIONS

This application is the U.S. National Stage of International Patent Application No. PCT/KR2017/008730 filed on Aug. 11, 2017, which claims the priority to Korean Patent Application No. 10-2016-0108337 filed in the Korean Intellectual Property Office on Aug. 25, 2016, the entire contents of which are incorporated herein by reference.

TECHNICAL FIELD

The present disclosure relates to an unmanned automated hook-fastening device.

BACKGROUND ART

A crane is a conveying machine for hoisting and moving various types of freight vertically and laterally in a variety of sites.

Such a crane uses a crane hook as a lifting tool. The hook is a fastening tool configured to be reliably fastened to an object to be hoisted, so that the crane can move the object to be hoisted to a loading location.

That is, the crane hook connects the crane and the object to be hoisted. When the crane is to move the object to be hoisted, the first operation is to fasten the crane hook to the object be hoisted.

When fastening the crane hook to the object to be hoisted, the crane hook must be correctly fastened to the object so that the object cannot be detached from the crane hook while the crane is moving the object.

However, there are various types of crane hooks having significant weights, depending on the object to be hoisted, so it may be difficult for workers to fasten the crane hook to the object to be hoisted.

To solve these problems involved in the hook-fastening operation, systems facilitating the hook-fastening operation have been developed. As examples of such systems helping the hook-fastening operation, Korean Patent No. 10-0855859 (dated on Aug. 26, 2008; titled "*Automatic Hook Tracing Apparatus Using Tilt Sensor in Image Monitoring System of Jib-Type Crane*"), Korean Patent No. 10-1093343 (dated on Dec. 6, 2011; titled "*Method of Controlling Automatic Hook Turning Position Using Laser Scanner in Crane*"), and Korean Patent No. 10-1311873 (dated on Sep. 17, 2013; titled "*Camera System for Downward Monitoring of Hook in Tower Crane*") may be presented.

However, such related-art systems for helping the hook-fastening operation are configured to indirectly control the hook while monitoring the hook-fastening operation, using a video device, such as a camera or a monitor, which is additionally provided, or a scanner provided to scan and locate the hook. In such systems, a monitoring operation is necessary, and excessive system components increase construction costs, which are problematic.

In addition, the video device may be disposed adjacently to the hook, and an accident in which a hook-fastening device breaks the video device in the hook-fastening process may frequently occur. Accordingly, maintenance of the video device may be difficult.

Furthermore, such systems may be unable to rapidly locate an object to be hoisted and to rapidly fasten the hook to the object to be hoisted, thereby causing problems in which the hook-fastening operation may be significantly slowed down and must be carried out by field personnel.

DISCLOSURE

Technical Problem

Accordingly, the present disclosure has been made in consideration of the above-described problems occurring in the related art, and the present disclosure proposes an unmanned automated hook-fastening device that can easily track the position of a hook of an object to be hoisted, automatically fasten hook pliers to the hook, and automatically fasten the hook to a crane without a monitoring system, and technology for unloading the object to an intended location on the ground.

Technical Solution

According to an aspect of the present disclosure, an unmanned automated hook-fastening device includes: a device coupler including a height-adjustable wire and configured to be coupled to a hoisting unit, such as a movable flying vehicle or a crane boom; a propulsion unit able to adjust a position of the hoisting unit with respect to an object to be hoisted; a transmitter disposed on one of the propulsion unit and the object to generate a position signal of one of the object and the hoisting unit; a receiver disposed on the other one of the propulsion unit and the object to receive the position signal; hook pliers configured to be fastened to a hook of the object; and an unloading transmitter fixed to the ground to transmit an ultrasonic signal and position information thereof, thereby assisting in calculation of the position of the hook during unloading of the object. The propulsion unit adjusts the position of the hoisting unit with respect to the object, on the basis of the position signal transmitted by the transmitter and received by the receiver.

Advantageous Effects

The unmanned automated hook-fastening device according to an aspect of the present disclosure includes: a device coupler including a height-adjustable wire and configured to be coupled to a hoisting unit, such as a movable flying vehicle or a crane boom; a propulsion unit able to adjust the position of the hoisting unit with respect to an object to be hoisted; a transmitter disposed on one of the propulsion unit and the object to generate a position signal of one of the object and the hoisting unit; a receiver disposed on the other one of the propulsion unit and the object to receive the position signal; hook pliers configured to be fastened to a hook of the object; and an unloading transmitter fixed to the ground to transmit an ultrasonic signal and position information thereof, thereby assisting in calculation of the position of the hook during unloading of the object. The propulsion unit adjusts the position of the hoisting unit with respect to the object, on the basis of the position signal transmitted by the transmitter and received by the receiver, so that the hook of the object can be easily traced, and the hook pliers can be automatically fastened to the hook. Accordingly, the hook of the object can be automatically fastened to the crane without a separate monitoring system. The propulsion unit adjusts the position of the hoisting unit coupled to the object, on the basis of the position signal transmitted by the unloading transmitter and received by the receiver, so that the object can be accurately unloaded on an intended location.

BEST MODE

Hereinafter, an unmanned automated hook-fastening device according to embodiments of the present disclosure will be described with reference to the accompanying drawings.

Figure 1:
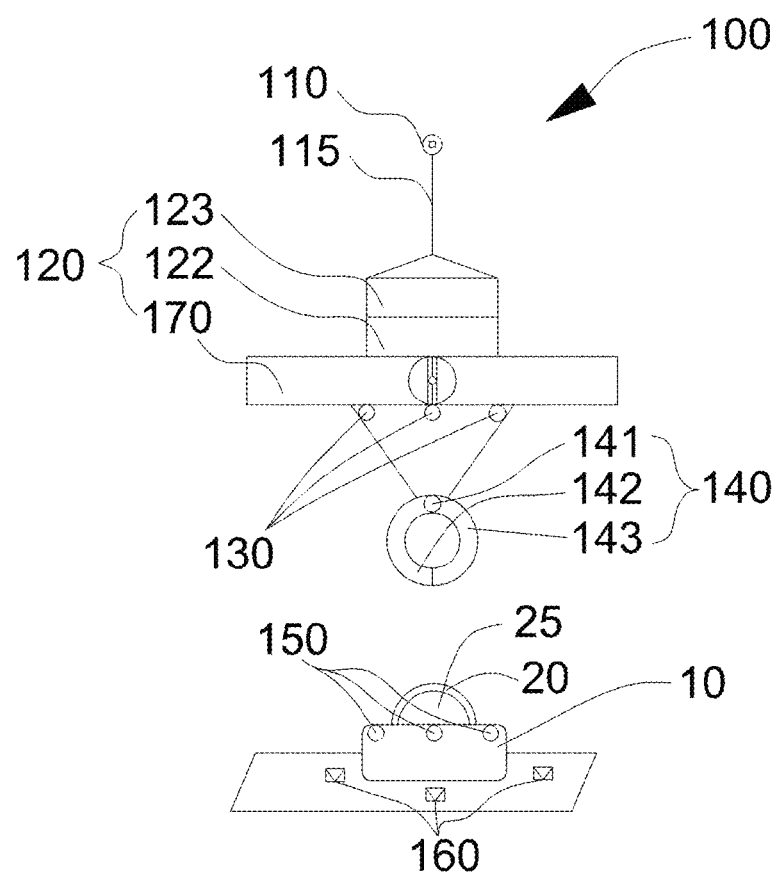
FIG. 1 is an end view illustrating a structure of an unmanned automated hook-fastening device according to a first embodiment of the present disclosure.
Figure 2:
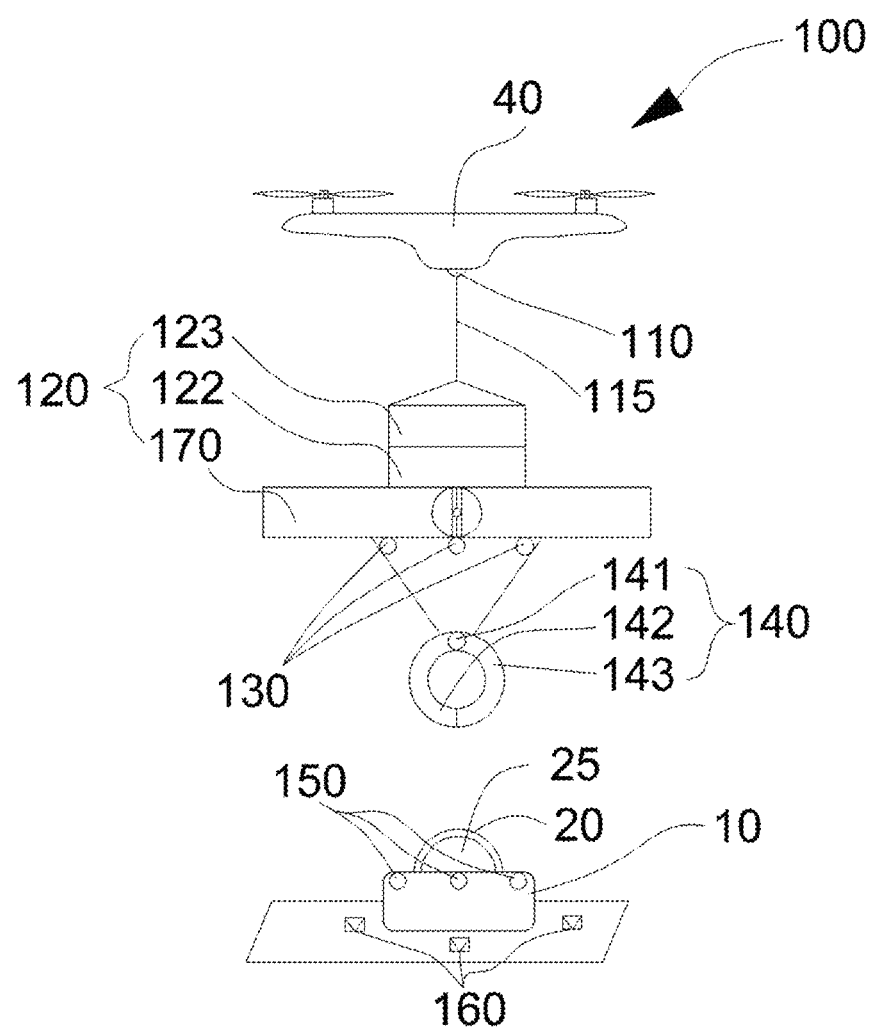
FIG. 2 is a front view illustrating the device coupler according to the first embodiment of the present disclosure, coupled to a flying vehicle.
Figure 3:
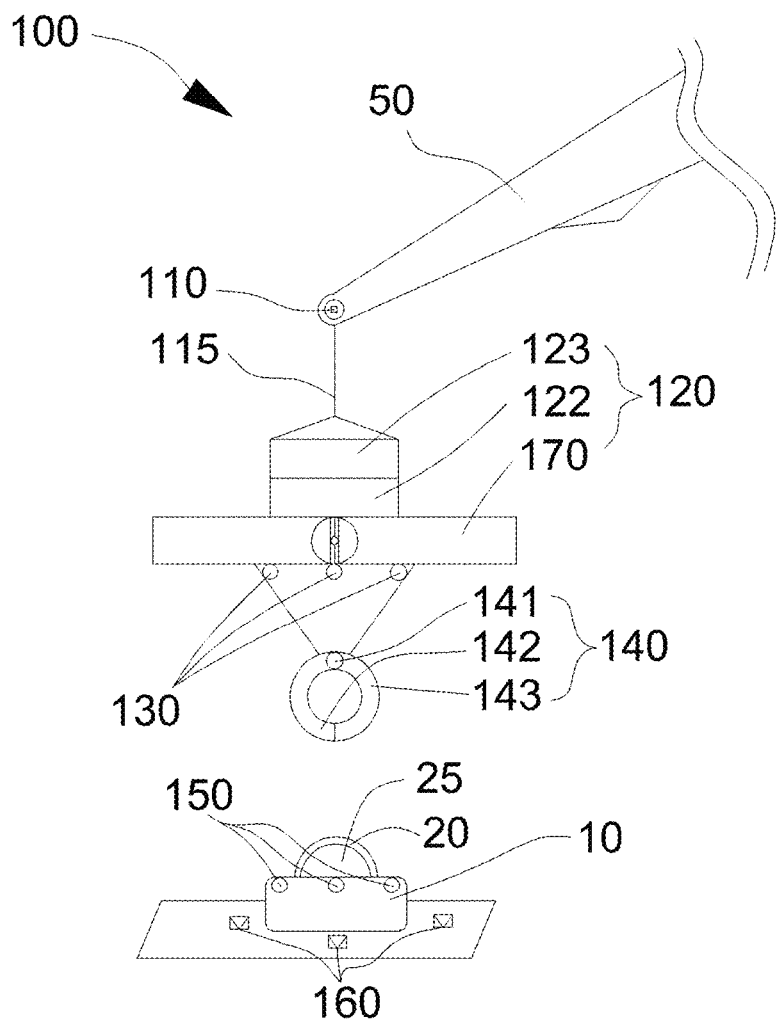
FIG. 3 is a front view illustrating the device coupler according to the first embodiment of the present disclosure, coupled to a crane boom.
Figure 4:
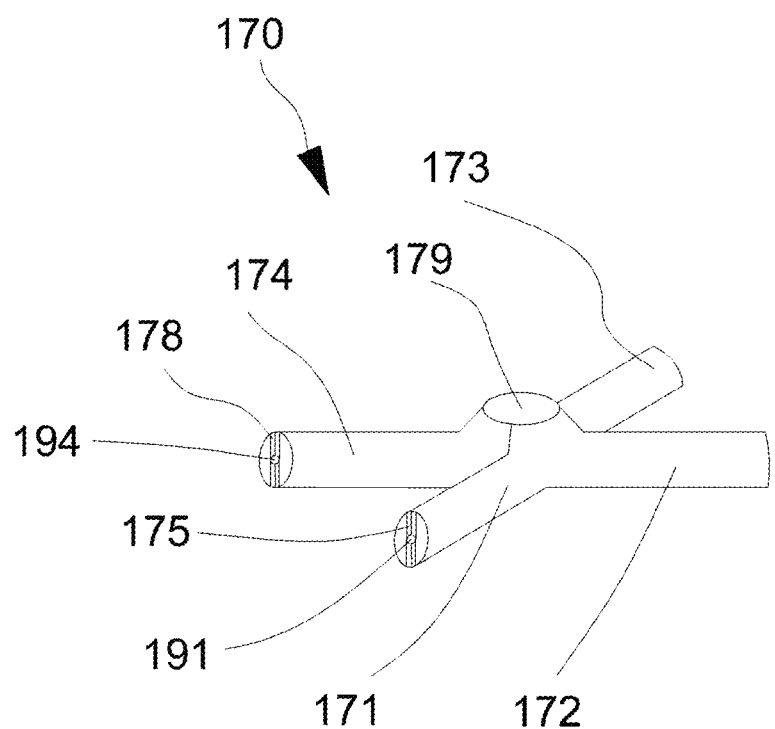
FIG. 4 is a front perspective view illustrating a hook direction-adjusting member according to the first embodiment of the present disclosure.
Figure 5:
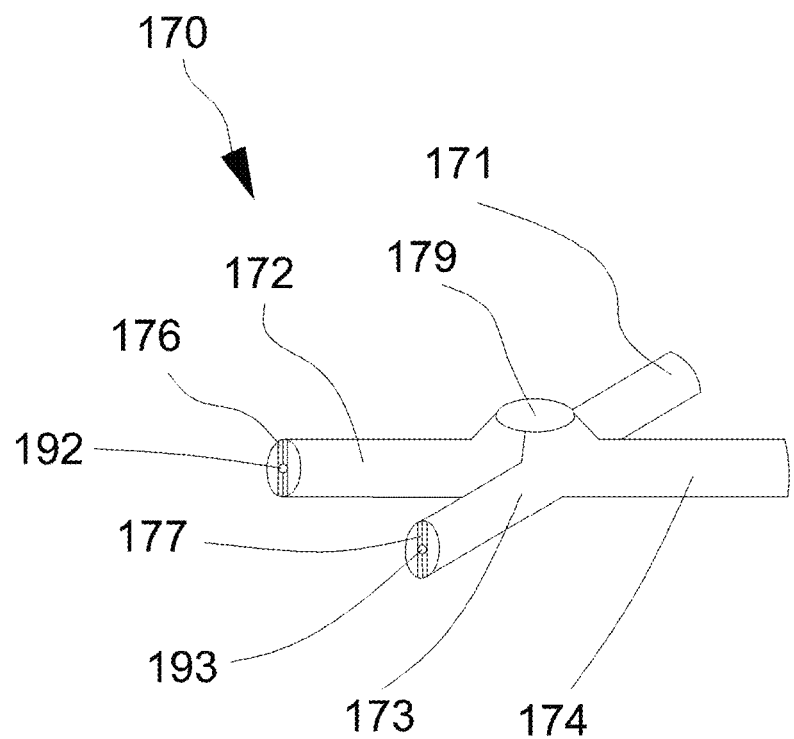
FIG. 5 is a rear perspective view illustrating the hook direction-adjusting member according to the first embodiment of the present disclosure.
Figure 6:
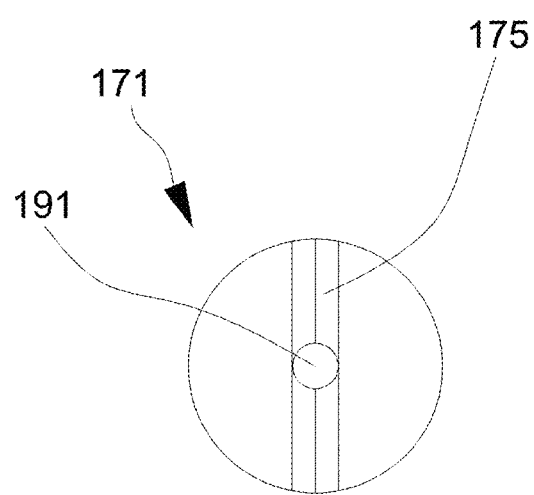
FIG. 6 is a front view illustrating the open position of a first valve of the first direction portion according to the first embodiment of the present disclosure.
Figure 7:
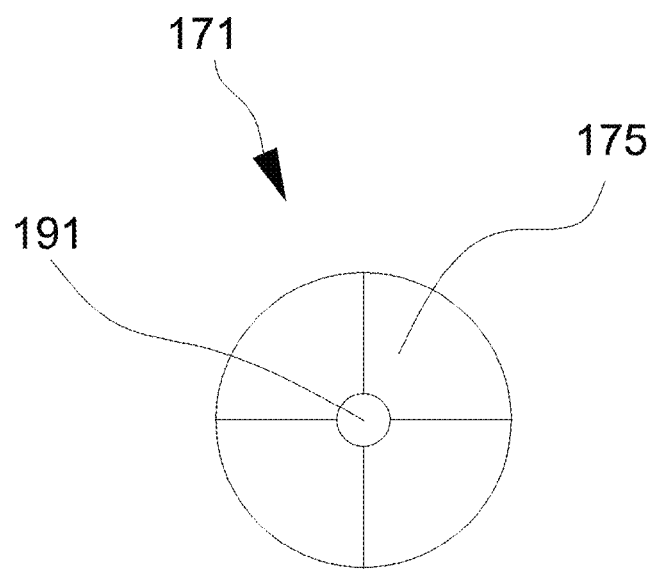
FIG. 7 is a front view illustrating the closed position of the first valve of the first direction portion according to the first embodiment of the present disclosure.
Figure 8:
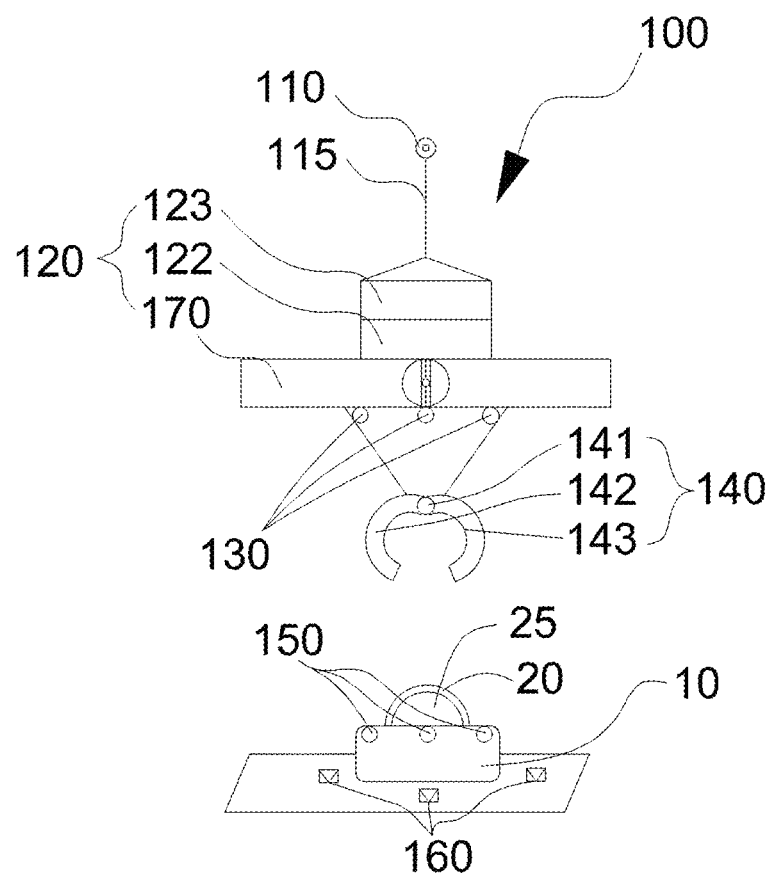
FIG. 8 is a front view illustrating the hook actuator operated to actuate the first plier and the second plier according to the first embodiment of the present disclosure to be opened and spaced apart from each other.
Figure 9:
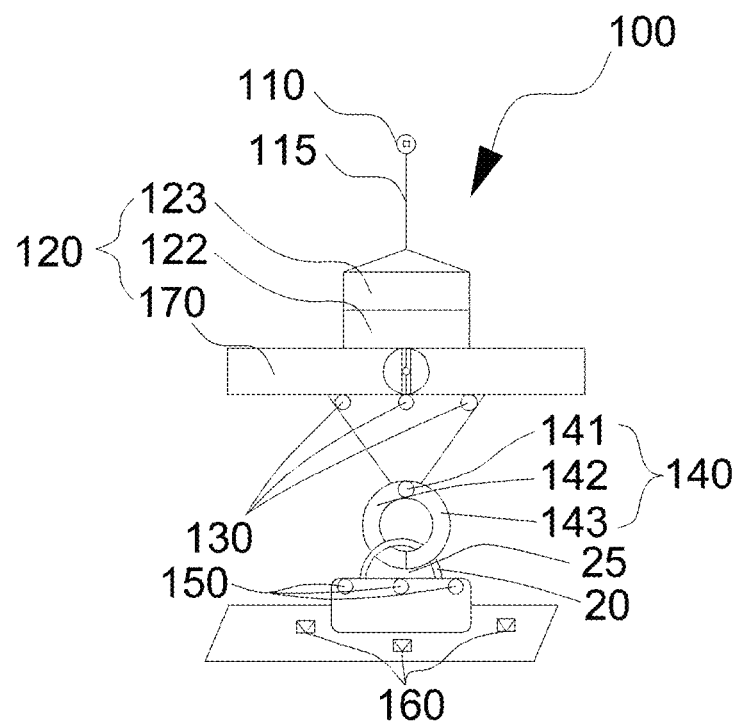
FIG. 9 illustrates the hook fastened to the hook pliers according to the first embodiment of the present disclosure.

FIG. 1 is an end view illustrating a structure of an unmanned automated hook-fastening device according to a first embodiment of the present disclosure; FIG. 2 is a front view illustrating the device coupler according to the first embodiment of the present disclosure, coupled to a flying vehicle; FIG. 3 is a front view illustrating the device coupler according to the first embodiment of the present disclosure, coupled to a crane boom; FIG. 4 is a front perspective view illustrating a hook direction-adjusting member according to the first embodiment of the present disclosure; FIG. 5 is a rear perspective view illustrating the hook direction-adjusting member according to the first embodiment of the present disclosure; FIG. 6 is a front view illustrating the open position of a first valve of the first direction portion according to the first embodiment of the present disclosure; FIG. 7 is a front view illustrating the closed position of the first valve of the first direction portion according to the first embodiment of the present disclosure; FIG. 8 is a front view illustrating the hook actuator operated to actuate the first plier and the second plier according to the first embodiment of the present disclosure to be opened and spaced apart from each other; and FIG. 9 illustrates the hook fastened to the hook pliers according to the first embodiment of the present disclosure.

Referring to FIGS. 1 to 9, the unmanned automated hook-fastening device 100 according to the present embodiment includes a coupler 110, receivers 130, a propulsion unit 120, transmitters 150, hook pliers 140, and unloading transmitters 160.

Reference number 10 indicates an object to be hoisted by the unmanned automated hook-fastening device 100, while reference number 20 indicates a hook connected to the object 10 to be hoisted and fastened to the hook pliers 140, thereby connecting the object 10 to the unmanned automated hook-fastening device 100.

The hook 20 has a hook hole 25 to which the hook pliers 140 are fastened.

The device coupler 110 includes a height-adjustable wire 115, and is able to be coupled to a hoisting unit 40 or 50, which is a movable flying vehicle 40 or a crane boom 50. When the device coupler 110 is coupled to the hoisting unit 40 or 50, i.e. the flying vehicle 40 or the crane boom 50, the unmanned automated hook-fastening device 100 may be movable by the hoisting unit 40 or 50.

Here, the device coupler 110 may be hooked and coupled to, for example, a hooking portion of the hoisting unit 40 or 50, i.e. the flying vehicle 40 or the crane boom 50.

As illustrated in FIG. 2, when the device coupler 110 and the flying vehicle 40 are coupled, the unmanned automated hook-fastening device 100 may be moved in the air, following the movement of the flying vehicle 40. Depending on the range in which the flying vehicle 40 moves, the range in which the unmanned automated hook-fastening device 100 moves may be limited.

In addition, as illustrated in FIG. 3, when the device coupler 110 is coupled to the crane boom 50, the position of the unmanned automated hook-fastening device 100 may be changed, following the movement of the crane boom 50. Depending on the range in which the crane boom 50 moves, the range in which the unmanned automated hook-fastening device 100 moves may be limited.

The propulsion unit 120 can adjust the position of the hoisting unit 40 or 50 with respect to the object 10.

The propulsion unit 120 can adjust the position depending on the position of the object 10, on the basis of position signals received by the receivers 130.

The transmitters 150 are disposed on one of the propulsion unit 120 and the object 10 to generate position signals regarding the position of the object 10 or the hoisting unit 40 or 50.

The receivers 130 are disposed on the other one of the propulsion unit 120 and the object 10 to receive the position signals.

The transmitters 150 generate the position signals in the form of ultrasonic signals. The object 10 can be located by measuring the distances between the transmitters 150 and the receivers 130, on the basis of a speed at which the ultrasonic signals are transmitted to the receivers 130 and times taken for the ultrasonic signals to be transmitted to the receivers 130.

According to the above-described configuration, the propulsion unit 120 can adjust the position of the hoisting unit 40 or 50 with respect to the object 10, on the basis of the position signals generated by the transmitters 150 and received by the receivers 130.

Although the present embodiment has been described as the transmitters 150 are disposed on the object 10 and the receivers 130 are disposed on the propulsion unit 120, the receivers 130 may be disposed on the object 10 and the transmitters 150 may be disposed on the propulsion unit 120.

According to the above-described configuration, the transmitters 150 generate the position signals in the form of ultrasonic signals. The object 10 can be located by measuring the distance between the transmitters 150 and the receivers 130, on the basis of a speed at which the ultrasonic signals are transmitted to the receivers 130.

Here, the receivers 130 may be three or more receivers provided on the same plane, in positions spaced apart from each other. In the same manner as the receivers 130, the transmitters 150 may be a plurality of transmitters provided in positions spaced apart from each other to be adjacent to the hook 20 of the object 10.

According to the above-described configuration, it is possible to perform position measurement, on the basis of an ultrasonic positioning system (UPS) in which the plurality of receivers 130 and the plurality of transmitters 150 use ultrasonic waves.

Here, the UPS is an ultrasonic positioning system configured to measure a distance, on the basis of a time taken for an ultrasonic wave to be transmitted and a speed of the ultrasonic wave, and to convert the measured distance into a position by trilateration.

That is, it is possible to accurately locate the object 10 by measuring distances of the object 10 to the receivers 130, on the basis of speeds of ultrasonic signals generated by the transmitters 150 and times taken for the ultrasonic signals to arrive at the receivers 130, and calculating the position of the object 10 by trilateration using the distances measured by the receivers 130.

The hook pliers 140 are configured to be fastened to the hook 20 of the object 10.

The hook pliers 140 include a first plier 142 and a second plier 143 able to engage with each other, as well as a hook actuator 141 able to actuate the first plier 142 and the second plier 143 to be engaged with or disengaged from each other.

When the first plier 142 and the second plier 143 are disengaged by operating the hook actuator 141, the engaging portions of the first plier 142 and the second plier 143 may be spaced apart from each other by a predetermined distance or more.

According to the above-described configuration, the hook 20 may be inserted into an open portion between the first plier 142 and the second plier 143.

Specifically, the hook 20 is inserted so that the hook hole 25 is located in the open portions of the first plier 142 and the second plier 143, and the first plier 142 and the second plier 143 are caused to engage each other in the position of the hook hole 25 by operating the hook actuator 141. Consequently, the hook pliers 140 can be caught by the hook hole 25 and be fastened to the hook 20.

The process of fastening the hook 20 to the hook pliers 140 as described above may be automatically carried out by the hook actuator 141 when the hook pliers 140 are in positions in which the hook pliers 140 can be fastened to the hook 20.

According to the above-described configuration, the hook pliers 140 are fastened to the hook 20 connected to the object 10, so that the unmanned automated hook-fastening device 100 can move the object 10 to an intended location.

The unloading transmitters 160 are fixed to the ground to generate ultrasonic signals and position information thereof, thereby assisting in calculation of the position of the hook during unloading of the object. It is possible to adjust the position of the hoisting unit 40 or 50 to be a preset position, on the basis of the position values.

According to the above-described configuration, the propulsion unit 120 can adjust the position of the hoisting unit 40 or 50 coupled to the object 10, on the basis of the position signals, transmitted by the unloading transmitters 160 and received by the receivers 130, so that the object 10 is accurately unloaded on a preset location.

That is, the propulsion unit 120 can adjust the position of the hoisting unit 40 or 50 with respect to the object 10, on the basis of the position signals, transmitted by the transmitters 150 and received by the receivers 130, and the ultrasonic signals, while adjusting the hoisting unit 40 or 50 coupled to the object 10, on the basis of the position signals, transmitted by the unloading transmitters 160 and received by the receivers 130.

The propulsion unit 120 includes a hook direction control member 170 having the shape of a hollow pipe allowing air to flow therethrough, a first fan motor 123 blowing an air flow rotating in one direction into the hook direction control member 170, so that the hook pliers 140 move to one side, and a second fan motor 122 blowing an air flow rotating in the other direction into the hook direction control member 170, so that the hook pliers 140 move to the other side.

Here, the term "one direction" may, for example, be clockwise and inclined toward the second plier 143 with respect to the hook actuator 141 illustrated in FIG. 1, while the term "the other direction" may, for example, be counterclockwise and inclined toward the first plier 142 with respect to the hook actuator 141 illustrated in FIG. 1.

According to the above-described configuration, it is possible to adjust the position of the hook pliers 140 using an air flow generated by driving at least one of the first fan motor 123 and the second fan motor 122.

Here, each of the first fan motor 123 and the second fan motor 122 may be provided as a motor, the speed of which is accurately controllable, and to which a fan is connected.

According to the above-described configuration, when only the first fan motor 123 is operated and the second fan motor 122 is not operated, the fan of the first fan motor 123 rotates in the clockwise direction, thereby generating an air flow moving to one side. Here, the air flow generated by the first fan motor 123 generates propulsion by which the unmanned automated hook-fastening device 100 can be moved to one side.

In addition, when only the second fan motor 122 is operated and the first fan motor 123 is not operated, the fan of the second fan motor 122 rotates in the counterclockwise direction, thereby generating an air flow moving to the other side. Here, the air flow generated by the second fan motor 122 generates propulsion by which the unmanned automated hook-fastening device 100 can be moved to the other side.

In addition, in a case in which the first fan motor 123 and the second fan motor 122 are operated simultaneously, when the driving force of the first fan motor 123 is greater than the driving force of the second fan motor 122, the propulsion by which the unmanned automated hook-fastening device 100 can be moved to one side is reduced by the propulsion by which the unmanned automated hook-fastening device 100 can be moved to the other side.

Furthermore, in a case in which the first fan motor 123 and the second fan motor 122 are operated simultaneously, when the driving force of the second fan motor 122 is greater than the driving force of the first fan motor 123, the propulsion by which the unmanned automated hook-fastening device 100 can be moved to the other side is reduced by the propulsion by which the unmanned automated hook-fastening device 100 can be moved to one side.

That is, the propulsion unit 120 can control the position and the speed of movement using the driving force of the first fan motor 123 and the driving force of the second fan motor 122.

The hook direction control member 170 is provided with a central direction portion 179 in the central portion thereof, the central direction portion 179 being configured to receive air flows from the first fan motor 123 and the second fan motor 122.

A first direction portion 171, a second direction portion 172, a third direction portion 173, and a fourth direction portion 174 extend from the central direction portion 179 in four directions.

The first direction portion 171, the second direction portion 172, the third direction portion 173, and the fourth direction portion 174 are provided with a first valve 175, a second valve 176, a third valve 177, and a fourth valve 178, respectively.

According to the above-described configuration, the first valve 175, the second valve 176, the third valve 177, and the fourth valve 178 are provided with a first valve actuator 191, a second valve actuator 192, a third valve actuator 193, and a fourth valve actuator 194, respectively. It is possible to accurately open and close the first valve 175, the second valve 176, the third valve 177, and the fourth valve 178 by controlling the first valve actuator 191, the second valve actuator 192, the third valve actuator 193, and the fourth valve actuator 194, thereby accurately adjusting the position of the hook pliers 140.

The first valve actuator 191, the second valve actuator 192, the third valve actuator 193, and the fourth valve actuator 194 may be implemented, for example, as motors to rapidly control the positions of the first valve 175, the second valve 176, the third valve 177, and the fourth valve 178.

Here, the open position refers to a position in which the first valve 175 is opened, as illustrated in FIG. 6, such that air within the first direction portion 171 is movable outwardly, while the closed position refers to a position in which the first valve 175 is closed, as illustrated in FIG. 7, such that air within the first direction portion 171 is isolated from ambient air.

According to the above-described configuration, an air flow generated by at least one of the first fan motor 123 and the second fan motor 122 enters the hook direction control member 170 through the central direction portion 179, and exits through a valve in an on position, among the first valve 175, the second valve 176, the third valve 177, and the fourth valve 178, so that propulsion is generated in the direction opposite to the direction in which the air flow exits.

For example, in a case in which only the first valve 175 is opened, when an air flow generated by at least one of the first fan motor 123 and the second fan motor 122 enters the central direction portion, the air flow moves to the first direction portion 171 and exits outwardly, thereby generating propulsion in the direction of the other side of the first direction portion 171, so that the unmanned automated hook-fastening device 100 moves to the other side of the first direction portion.

In a case in which all of the first valve 175, the second valve 176, the third valve 177, and the fourth valve 178 are in on positions, moving the position of the unmanned automated hook-fastening device 100 using the on/off positions of the first valve 175, the second valve 176, the third valve 177, and the fourth valve 178 can more accurately move the unmanned automated hook-fastening device 100 than moving the position of the unmanned automated hook-fastening device 100 using the first fan motor 123 and the second fan motor 122, so that the hook pliers 140 can be more reliably fastened to the hook 20 of the object 10.

That is, since the first valve 175, the second valve 176, the third valve 177, and the fourth valve 178 are provided in the first direction portion 171, the second direction portion 172, the third direction portion 173, and the fourth direction portion 174, as described above, it is possible to accurately adjust the position of the unmanned automated hook-fastening device 100. Accordingly, it is possible to properly place the unmanned automated hook-fastening device 100 in a position required to more reliably fasten the hook pliers 140 to the hook 20 of the object 10.

Hereinafter, a process of automatically fastening the hook 20 of the object to the hook pliers 140 of the unmanned automated hook-fastening device 100 according to the present embodiment will be described.

First, ultrasonic signals generated by the plurality of transmitters 150 are transmitted to the plurality of receivers 130.

Here, it is possible to determine distances between the object 10 and the receivers 130, on the basis of speeds of the ultrasonic signals and times taken for the ultrasonic signals to be transmitted to the receivers 130. Since the receivers 130 are a plurality of receivers 130 and the transmitters 150 are a plurality of transmitters, it is possible to determine an accurate position, distance, and orientation of the hook 20 of the object by trilateration, on the basis of the ultrasonic signals received by the receivers 130, respectively.

When the position of the hook 20 is determined as described above, the flying vehicle 40 or the crane coupled to the device coupler 110 of the crane hook 20 moves the unmanned crane hook 20 to be adjacent to the object 10.

In this position, the hook pliers 140 are moved to a required position using the propulsion unit 120. The hook pliers 140 in the required position can be accurately fastened to the hook 20, so that the hook pliers 140 are accurately fastened to the hook 20.

Here, when at least one of an air flow generated by the first fan motor 123 and an air flow generated by the second fan motor 122 enters the hook direction control member 170 through the central direction portion 179, the air flow exits through a valve in an on position, among the first valve 175, the second valve 176, the third valve 177, and the fourth valve 178, so that propulsion is generated in the direction opposite to the direction in which the air flow exits.

For example, in a case in which only the first valve 175 is opened, when an air flow generated by at least one of the first fan motor 123 and the second fan motor 122 enters the central direction portion, the air flow moves to the first direction portion 171 and exits outwardly, thereby generating propulsion in the direction of the other side of the first direction portion 171, so that the unmanned automated hook-fastening device 100 moves to the other side of the first direction portion.

As described above, after the hook pliers 140 are moved to positions, required for the hook pliers 140 to be accurately fastened to the hook 20, using the propulsion unit 120, the hook actuator 141 is actuated to open the first plier 142 and the second plier 143.

In this position, the hook hole 25 is located in the open portions of the first plier 142 and the second plier 143, and the hook actuator 141 is operated to engage the first plier 142 and the second plier 143 in the position of the hook hole 25, so that the hook pliers 140 can be caught by the hook hole 25 and be fastened to the hook 20.

According to the above-described configuration, the hook pliers 140 are fastened to the hook 20 connected to the object 10, so that the unmanned automated hook-fastening device 100 can move the object 10 to an intended location.

Hereinafter, the sequence of the operation of the unmanned automated hook-fastening device 100 will be described.

First, position signals transmitted by the transmitters 150 to the receivers 130 are detected, and the unmanned automated hook-fastening device 100 is first moved so that the hook pliers 140 are firmly fastened to the hook 20.

In this position, when the hook pliers 140 are fastened to the hook due to the first movement performed using the transmitters 150 and the receivers 130, the propulsion unit 120 adjusts the position of the hoisting unit 40 or 50 coupled to the object 10, on the basis of the position signals and ultrasonic signals transmitted by the unloading transmitters 160 and received by the receivers 130.

In this position, when the adjustment of the position of the hoisting unit 40 or 50 coupled to the object 10 is completed, the object 10 can be accurately unloaded on a preset location.

Mode for Invention

Hereinafter, an unmanned automated hook-fastening device according to another embodiment of the present disclosure will be described with reference to the accompanying drawings. In the following, descriptions of some features will be omitted when they are identical to those of the above-described first embodiment of the present disclosure.

Figure 10:
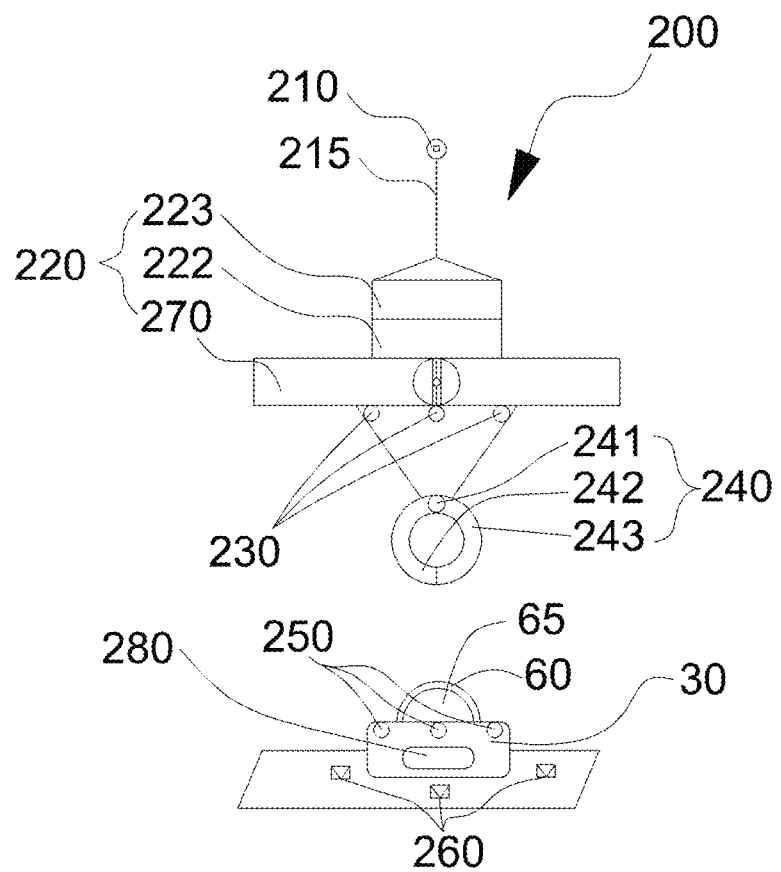
FIG. 10 is a view illustrating a structure of an unmanned automated hook-fastening device according to a second embodiment of the present disclosure.

FIG. 10 is a view illustrating a structure of an unmanned automated hook-fastening device according to a second embodiment of the present disclosure.

Referring to FIG. 10, an unmanned automated hook-fastening device 200 includes a global positioning system (GPS) receiver 280.

The PGS receiver 280 may be disposed on an object 30 to be hoisted, and receive GPS signals from a plurality of satellites to locate the object.

According to the above-described configuration, the position of the object 30 is determined on the basis of GPS signals received by the GPS receiver 280 from the satellites, and the unmanned automated hook-fastening device 200 performs a first movement so that hook pliers 240 are adjacent to the object 30.

In this position, when a hoisting unit arrives at a location within a preset distance from the object 30 due to the first movement using the GPS receiver 280, the operation of the GPS receiver 280 is stopped.

In this position, the unmanned automated hook-fastening device 200 performs a second movement by examining ultrasonic signals transmitted by transmitters 250 to receivers 230, so that the hook pliers 240 are firmly fastened to a hook 60. Accordingly, the hook pliers 240 are automatically fastened to the hook 60.

Figure 11:
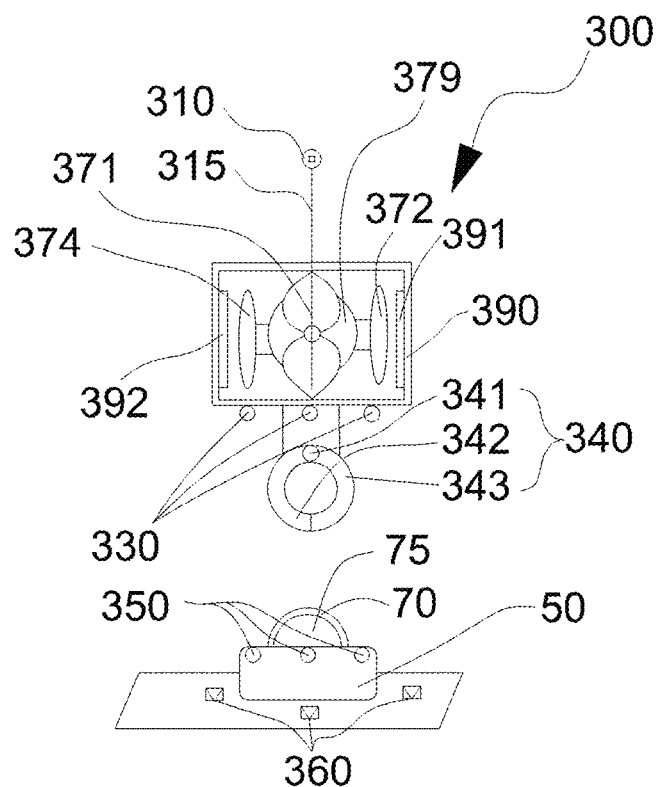
FIG. 11 is a cross-sectional view illustrating a structure of an unmanned automated hook-fastening device according to a third embodiment of the present disclosure.
Figure 12:
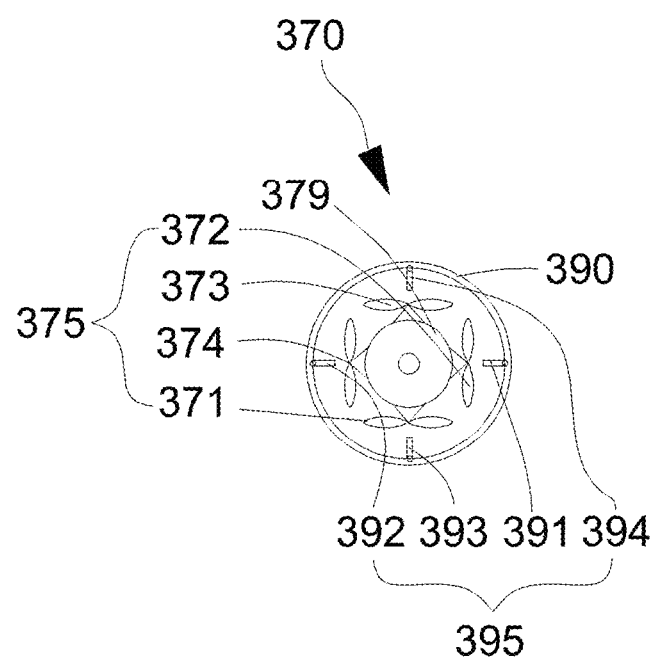
FIG. 12 is a cross-sectional view illustrating a structure of the direction changing unit according to the third embodiment of the present disclosure.
Figure 13:
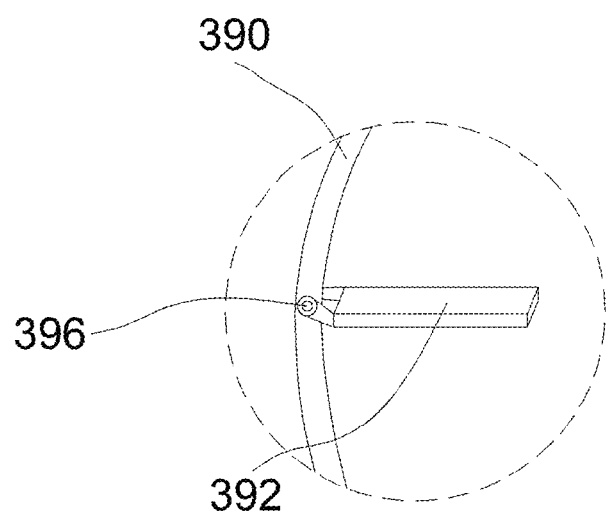
FIG. 13 is an enlarged view illustrating the second blade attached to the protective ring, according to the third embodiment of the present disclosure.

FIG. 11 is a cross-sectional view illustrating a structure of an unmanned automated hook-fastening device according to a third embodiment of the present disclosure, FIG. 12 is a cross-sectional view illustrating a structure of a direction changing unit according to the third embodiment of the present disclosure, and FIG. 13 is an enlarged view illustrating a second blade attached to a protective ring, according to the third embodiment of the present disclosure.

Referring to FIGS. 11 to 13, an unmanned automated hook-fastening device 300 includes a device coupler 310, receivers 330, a direction changing unit 370, transmitters 350, hook pliers 340, and unloading transmitters 360.

The direction changing unit 370 is configured to change the position of a hoisting unit with respect to an object 80 to be hoisted. The direction changing unit 370 can adjust the position of the hoisting unit depending on the position of the object 80, on the basis of position signals received by the receivers 330.

The direction changing unit 370 includes a body 379 forming a central portion of the direction changing unit 370, direction members 375 rotatably provided on circumferential portions of the body 379 to generate air flows to move the body 379, a protective ring 390 disposed around the direction members 375 to protect the direction members 375, and blades coupled to the protective ring 390, the blades being blade-shaped and direction-changeable to rotate the body 379.

Although the direction members 375 are comprised of a first direction member 372, a second direction member 374, a third direction member 371, and a fourth direction member 373 provided on the circumferential portions of the body 379 according to the present embodiment, the direction members 375 may be provided as three or more direction members allowing the body 379 to be movable in any directions rather than in a single direction.

Each of the direction members 375 includes blades, such as propeller blades, and a drive motor to generate an air flow using power applied to the drive motor.

In a case of adjusting the position of the hook pliers 340 such that the hook pliers 340 can be fastened to a hook 70 of the object 80, when the air flow is generated using one of the direction members 375, disposed in the other side with respect to a direction of movement, propulsion toward one side is generated.

In addition, for example, in a case in which the first direction member 372, the second direction member 374, the third direction member 371, and the fourth direction member 373 are oriented to the east, west, south, and north with respect to the body 379, propulsion toward the northwest is required to move the hook pliers 340 to the northeast. Accordingly, air flows are generated using the third direction member 371 disposed to the south and the second direction member 374 disposed to the west.

In addition, in order to move the hook pliers, for example, to the northeast, the third direction member 371, disposed to the south, and the second direction member 374, disposed to the west, are driven. In this case, the third direction member 371 is provided with a greater amount of driving force than the second direction member 374, such that a greater amount of propulsion is generated to the north.

As described above, it is possible to move the hook pliers 340 to a position in which the hook pliers 340 can be firmly fastened to the hook 70 by driving one of the direction members 375, disposed in the other side with respect to the direction in which the hook members 340 are intended to move.

When the body 379 is necessary to be accurately controlled or rapidly moved, it is possible to offset the rapid movement in the moving direction and anti-torque of the propeller by reversely rotating a direction member 375 in a side opposite to the member 375 that must be driven in the moving direction.

For example, in the case of driving the second direction member 374, when a rapid movement is necessary, it is possible to add driving fore to the second direction member 374 by reversely driving the first direction member 372, disposed in a side facing the second direction member 374, so that the body 379 can be rapidly moved.

Since an accident may be caused by the direction members 375 having the shape of a sharp blade and the direction members 375 may be deformed by an external object, the protective ring 390 serves to protect the direction members 375 so that no external object may approach the direction members 375.

The protective ring 390 may be implemented, for example, as a circular ring having a size allowing the direction members 375 to be disposed therein.

The direction members 375 are sandwiched between the protective ring 390 and the direction member 375, and are coupled to the protective ring 390.

The blades 395 are configured to rotate the body 379, instead of moving the body 379.

Although the blades 395 are comprised of a first blade 391, a second blade 392, a third blade 393, and a fourth blade 394 coupled to outer circumferential portions of the protective ring 390 according to the present embodiment, the blades 395 may be three or more blades allowing the body 379 to be rotatable in any directions instead of moving in a single direction.

The blades 395 allow the body 379 to rotate, using air flows generated by the direction members 375.

That is, the blades 395 change the direction of the body 395 by rotating the body.

The blades 395 are thin plates having a predetermined width, with portions thereof coupled to the protective ring 390 allowing the angles thereof to be adjusted.

For example, as in the second blade 392 illustrated in FIG. 13, a second motor 396 may be coupled to the protective ring 390 to adjust the angle of the second blade 392 with respect to the protective ring 390. The same configuration is applied to the first blade 391, the third blade 393, and the fourth blade 394.

While the present disclosure has been illustrated and described with respect to the specific exemplary embodiments, it will be apparent to a person having ordinary skill in the art that many modifications and variations are possible without departing from spirits and scopes of the present disclosure defined by appended claims. It is definitely noted that such modifications and variations are included within the scope of the present disclosure.

INDUSTRIAL APPLICABILITY

The unmanned automated hook-fastening device according to an aspect of the present disclosure can easily track the position a hook of an object to be hoisted, automatically fasten hook pliers to the hook, and automatically fasten the hook to a crane without a monitoring system. Therefore, the present disclosure is regarded as having high industrial applicability.

The invention claimed is:

1. An unmanned automated hook-fastening device comprising:
a device coupler including a height-adjustable wire and configured to be coupled to a hoisting unit;
a propulsion unit able to adjust a position of the hoisting unit with respect to an object to be hoisted;
a transmitter disposed on one of the propulsion unit and the object to generate a position signal of one of the object and the hoisting unit;
a receiver disposed on another of the propulsion unit and the object to receive the position signal;
hook pliers configured to be fastened to a hook of the object; and
an unloading transmitter fixed to the ground to transmit an ultrasonic signal and position information thereof, thereby assisting in calculation of the position of the hook during unloading of the object,
wherein the propulsion unit adjusts the position of the hoisting unit with respect to the object, on the basis of the position signal transmitted by the transmitter and received by the receiver, and adjusts the position of the hoisting unit coupled to the object, on the basis of the position signal transmitted by the unloading transmitter and received by the receiver,
wherein the propulsion unit comprises:
a hook direction control member having a shape of a hollow pipe allowing air to flow therethrough;
a first fan motor blowing an air flow rotating in one direction into the hook direction control member, so that the hook pliers move to one side; and
a second fan motor blowing an air flow rotating in the other direction into the hook direction control member, so that the hook pliers move to the other side,
wherein positions of the hook pliers are adjusted using an air flow generated by driving at least one the first fan motor and the second fan motor.

2. The unmanned automated hook-fastening device according to claim 1, wherein the hook direction control member comprises a central direction portion in a central portion thereof, the central direction portion being configured to receive air flows from the first fan motor and the second fan motor, and a first direction portion, a second direction portion, a third direction portion, and a fourth direction portion extending from the central direction portion in four directions, and
the first direction portion, the second direction portion, the third direction portion, and the fourth direction portion are provided with a first valve, a second valve, a third valve, and a fourth valve, respectively,
wherein the positions of the hook pliers are accurately adjustable, depending on on/off positions of the first valve, the second valve, the third valve, and the fourth valve.

3. The unmanned automated hook-fastening device according to claim 2, wherein the position signal transmitted by the transmitter to the receiver is detected, and the unmanned automated hook-fastening device is first moved so that the hook pliers are firmly fastened to the hook, and when the hook pliers are fastened to the hook due to the first movement performed using the transmitters and the receivers,
the propulsion unit adjusts the position of the hoisting unit coupled to the object, on the basis of the position signal and an ultrasonic signal transmitted by the unloading transmitter and received by the receiver.

4. An unmanned automated hook-fastening device comprising:
a device coupler including a height-adjustable wire and configured to be coupled to a hoisting unit;
a propulsion unit able to adjust a position of the hoisting unit with respect to an object to be hoisted;
a transmitter disposed on one of the propulsion unit and the object to generate a position signal of one of the object and the hoisting unit;
a receiver disposed on another of the propulsion unit and the object to receive the position signal;
hook pliers configured to be fastened to a hook of the object; and an unloading transmitter fixed to the round to transmit an ultrasonic signal and position information thereof, thereby assisting in calculation of the position of the hook during unloading of the object, wherein the propulsion unit adjusts the position of the hoisting unit with respect to the object, on the basis of the position signal transmitted by the transmitter and received by the receiver, and adjusts the position of the hoisting unit coupled to the object, on the basis of the position signal transmitted by the unloading transmitter and received by the receiver, wherein the unmanned automated hook-fastening device further comprises:

a global positioning system (GPS) receiver disposed on the object to be hoisted, and receive GPS signals from a plurality of satellites to locate the object, wherein a position of the object is determined on the basis of GPS signals received by the GPS receiver from the satellites, and the unmanned automated hook-fastening device performs a first movement so that hook pliers are adjacent to the object, and wherein, when the hoisting unit arrives at a location within a preset distance from the object due to the first movement using the GPS receiver, the unmanned automated hook-fastening device performs a second movement by examining the ultrasonic signal transmitted to the receiver by the transmitter, so that the hook pliers are firmly fastened to the hook.

5. An unmanned automated hook-fastening device comprising:

a device coupler including a height-adjustable wire and configured to be coupled to a hoisting unit;

a direction changing unit able to adjust a position of the hoisting unit with respect to an object to be hoisted;

a transmitter disposed on one of the direction changing unit and the object to generate a position signal of one of the object and the hoisting unit;

a receiver disposed on another of the direction changing unit and the object to receive the position signal;

hook pliers configured to be fastened to a hook of the object; and an unloading transmitter fixed to the ground to transmit an ultrasonic signal and position information thereof, thereby assisting in calculation of the position of the hook during unloading of the object, wherein the propulsion unit adjusts the position of the hoisting unit with respect to the object, on the basis of the position signal transmitted by the transmitter and received by the receiver, and wherein the direction changing unit comprises:

a body;

direction members rotatably provided on circumferential portions of the body to generate air flows to move the body;

a protective ring disposed around the direction members to protect the direction members; and blades coupled to the protective ring, the blades being blade-shaped and direction-changeable to rotate the body.

* * * * *